(12) United States Patent
Katsumata et al.

(10) Patent No.: US 6,865,951 B2
(45) Date of Patent: Mar. 15, 2005

(54) SEMICONDUCTOR PRESSURE SENSOR

(75) Inventors: Takashi Katsumata, Kariya (JP); Inao Toyoda, Anjo (JP); Hiroaki Tanaka, Kariya (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 10/791,890

(22) Filed: Mar. 4, 2004

(65) Prior Publication Data

US 2004/0177699 A1 Sep. 16, 2004

(30) Foreign Application Priority Data

Mar. 13, 2003 (JP) ........................................ 2003-067957

(51) Int. Cl.$^7$ ................................................ G01L 9/16
(52) U.S. Cl. .............................. 73/754; 73/700; 73/777; 438/50
(58) Field of Search ................... 73/700–727, 753–777, 73/514.6, 754; 438/48–50

(56) References Cited

U.S. PATENT DOCUMENTS

| | | | | |
|---|---|---|---|---|
| 3,513,430 A | * | 5/1970 | Heller ........................ | 73/754 |
| 3,697,918 A | * | 10/1972 | Orth et al. .................. | 73/754 |
| 3,772,628 A | * | 11/1973 | Underwood et al. .......... | 73/726 |
| 4,507,170 A | * | 3/1985 | Myhre ......................... | 216/33 |
| 4,986,861 A | * | 1/1991 | Nishida et al. ............... | 73/726 |
| 6,595,065 B2 | | 7/2003 | Tanizawa et al. | |
| 6,601,452 B2 | | 8/2003 | Murata et al. | |
| 6,612,180 B1 | * | 9/2003 | Kurtz .......................... | 73/754 |
| 6,649,988 B2 | | 11/2003 | Toyoda et al. | |
| 6,718,829 B2 | * | 4/2004 | Baba et al. .................. | 73/754 |
| 6,789,431 B2 | * | 9/2004 | Ishio .......................... | 73/754 |

* cited by examiner

Primary Examiner—Edward Lefkowitz
Assistant Examiner—Alandra Ellington
(74) Attorney, Agent, or Firm—Posz & Bethards, PLC

(57) ABSTRACT

In a diaphragm (30) having a square shape comprising four sides of a pair of first sides (31, 32) extending along the <110> crystal axis direction and a pair of second sides (33, 34) extending along the <100> crystal axis direction, when an axis bisecting each of the first sides (31, 32) of the diaphragm (30) and passing through the center point of the diaphragm is set as a first axis K1 and an axis vertically-intersecting to the first axis K1 and passing through the center point of the diaphragm is set as a second axis K2, each of the side gages Rs1, Rs2 is located on a virtual line T1, T2, T3, T4 which extends from the center point of each of the center gages Rc1, Rc2 to the peripheral portion of the diaphragm (30) and intersects to the first axis K1 and the second axis K2 at 45°.

4 Claims, 3 Drawing Sheets

SEMICONDUCTOR PRESSURE SENSOR

CROSS REFERENCE TO RELATED APPLICATION

This application is based upon, claims the benefit of priority of, and incorporates by reference the contents of, Japanese Patent Application No. 2003-67957 filed on Mar. 13, 2003.

FIELD OF THE INVENTION

The present invention relates to a diaphragm type semiconductor pressure sensor having a pressure detecting diaphragm and a strain gage resistor formed on a semiconductor substrate whose primary surface corresponds to (110)-face.

BACKGROUND OF THE INVENTION

This type of semiconductor pressure sensor is equipped with a semiconductor substrate whose principle surface corresponds to (110)-face, a pressure detecting diaphragm formed on the principle surface of the semiconductor substrate, and a strain gage resistor constituting a bridge circuit which is formed on the diaphragm and outputs a detection signal in connection with strain of the diaphragm (for example, see JP-A-2001-356061, p3, FIG. 1 (Patent Document 1)).

Here, the strain gage resistor disposed on the (110)-face comprises a pair of center gages arranged at the center portion of the diaphragm along the <110> crystal axis direction, and a pair of side gages arranged to be nearer to the peripheral side of the diaphragm than the center gages (for example, see JP-A-11-94666, p11, FIG. 15 (Patent Document 2)).

Here, FIG. 4 is a diagram showing the arrangement of strain gage resistors Rc1, Rc2, Rs1, Rs2 in a diaphragm 30 formed on the principle surface of a semiconductor substrate 10 of a related art semiconductor pressure sensor using the semiconductor substrate described above. Two crystal axes <110> and <100> which are orthogonal to each other structurally exist on the (110)-face corresponding to the principle surface of the semiconductor substrate 10.

Here, the sensitivity of stress occurring in the <110> crystal axis direction has a remarkably larger piezo-resistance coefficient than the sensitivity of stress occurring in the <100> crystal axis direction, and thus the stress occurring, not in the <100> crystal axis direction, but in the <110> crystal axis direction is used to detect the stress on the (110)-face.

Since <110> of only one direction exists on the (110)-face, the arrangement of the strain gage resistors Rc1, Rc2, Rs1, s2 shown in FIG. 4 must be necessarily adopted to achieve a higher output with respect to the crystal axis having higher sensitivity.

That is, the center gages Rc1, Rc2 disposed at the center side of the diaphragm 30 along the <110> crystal axis direction and the side gages Rs1, Rs2 disposed to be nearer to the peripheral side of the diaphragm 39 than the center gages Rc1, Rc2 are equipped, and the bridge circuit is constructed by these four strain gage resistors to detect the stress occurring in the <110> crystal axis direction.

Specifically, the resistance values of the center gages Rc1 and Rc2 are set to RA and RD respectively, the resistance values of the side gages Rc3 and Rc4 are set to RB and RA respectively, and these strain gage resistors are connected to one another in series to form a rectangular closed circuit, thereby constructing a Wheatstone bridge as shown in FIG. 5.

In the bridge circuit 100 shown in FIG. 5, strain of the diaphragm 30 appears as variations of the resistance values of the strain gage resistors RA, RB, RC, RD under the state that DC constant current I is supplied from an input terminal Ia to an input terminal Ib, and the voltage (detection signal) whose level corresponds to detected pressure, that is, a midpoint potential Vout is output between output terminals Pa and Pb.

Such a semiconductor pressure sensor as described above is normally designed so that a glass seat is attached to the semiconductor substrate 10 by anode bonding or the like as disclosed in the Patent Document 1, for example.

The semiconductor substrate 10 and the glass seat are different in thermal expansion coefficient. Therefore, when the temperature is varied, thermal stress occurs between both the glass seat and the semiconductor substrate 10, and the thermal stress thus occurring is transmitted to the strain gage resistors Rc1, Rc2, Rs1, Rs2 on the diaphragm 30. Here, the thermal stress applied to the center gages Rc1, Rc2 and the thermal stress applied to the side gages Rs1, Rs2 are different from each other in magnitude because the locating positions thereof on the diaphragm 20 are different.

As a result, the difference between the thermal stress applied to the side gages Rs1, Rs2 and the thermal stress applied to the center gages Rc1, Rc2 is output as a noise. Since the difference in thermal stress is nonlinearly varied dependently on the temperature, the temperature characteristic of the offset of the output is curved with respect to the temperature.

Accordingly, some difference occurs between the gradient of the offset with respect to the temperature in the range from the room temperature to a high temperature and the gradient of the offset with respect to the temperature in the range from a low temperature to the room temperature in the temperature characteristic of the offset of the output. This difference is referred to as TNO (Temperature Nonlinearity Offset), and it is an important characteristic to determine the precision of the sensor.

Furthermore, when the semiconductor pressure sensor is promoted to be miniaturized, that is, the semiconductor substrate 10 is promoted to be miniaturized, it is considered to reduce the size of the diaphragm 30 occupying a large area. However, it has been found through studies of the inventors that if the diaphragm 30 is designed in a small size, the difference in thermal stress is increased between the side gages Rs1, Rs2 and the center gages Rc1, Rc2.

Therefore, as the size of the diaphragm 30 is smaller, the TNO characteristic is more degraded. Accordingly, a sensor structure which is improved without degrading the TNO characteristic has been required.

SUMMARY OF THE INVENTION

The present invention has been implemented in view of the above problem, and has an object to provide a semiconductor pressure sensor having a pressure detecting diaphragm and a strain gage resistor formed on a semiconductor substrate having (110)-face as a principle surface in which the difference between thermal stresses applied to center gages and side gages can be reduced at maximum.

The inventors have considered a semiconductor pressure sensor having a diaphragm formed on a principle surface of a semiconductor substrate whose principle surface corresponds to (110)-face, the diaphragm having a rectangular (e.g. square) plane shape containing four sides of a pair of first sides extending along the <110> crystal axis direction and a pair of second sides extending along the <100> crystal axis direction.

The inventors have analyzed the semiconductor pressure sensor as described above by using a finite element method (FEM), and determined how the difference in thermal stress occurring between the center gages and the side gages is distributed depending on various location on the diaphragm (see FIG. 3). The present invention has been implemented on the basis of the distribution state of the difference in thermal stress thus determined.

According to a first aspect of the present invention, the following features are provided to a semiconductor pressure sensor comprising a semiconductor substrate whose principle surface corresponds to (110)-face, a pressure detecting diaphragm formed on the principle surface of the semiconductor substrate and strain gage resistors (Rc1, Rc2, Rs1, Rs2) which are formed on the diaphragm and constitute a bridge circuit (100) for outputting a detection signal in connection with strain of the diaphragm, in which the planar shape of the diaphragm comprises four sides of a pair of first sides extending along the <110> crystal axis direction and a pair of second sides extending along the <100> crystal axis direction, and the strain gage resistors comprise a pair of center gages (Rc1, Rc2) disposed at the center portion of the diaphragm along the <110> crystal axis direction and a pair of side gages (Rs1, Rs2) disposed so as to be nearer to the peripheral portion of the diaphragm than the center gages.

That is, when an axis bisecting each of the first sides of the diaphragm and passing through the center point of the diaphragm is set as a first axis (K1) and an axis vertically-intersecting to the first axis and passing through the center point of the diaphragm is set as a second axis (K2) each of the side gages (Rs1, Rs2) is located on a virtual line (T1, T2, T3, T4) which extends from the center point of each of the center gages (Rc1, Rc2) to the peripheral portion of the diaphragm and intersects to the first axis and the second axis at 45°.

By adopting the positional arrangement of the side gages as described above, the difference between the thermal stress applied to the center gages (Rc1, Rc2) and the thermal stress applied to the side gages (Rs1, Rs2) can be reduced at maximum.

Here, according to a second aspect of the present invention, the pair of side gages (Rs1, Rs2) are preferably arranged to be symmetrical with each other with respect to the first axis (K1). Furthermore, according to a third aspect of the present invention, the pair of side gages (Rs1, Rs2) are preferably arranged to be symmetrical with each other with respect to the second axis (K2).

According to the second and third aspects, each of the strain gage resistors can be arranged as symmetrically as possible with respect to the center of the diaphragm, so that the strain gage resistors can be easily manufactured.

Reference numerals in parentheses of the respective units are provided as examples to indicate the corresponding relationship with specific elements described with respect to embodiments described later.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF THE PREFERRED EMBODIMENT

A preferred embodiment according to the present invention will be described hereunder with reference to the accompanying drawings.

Figure 1:
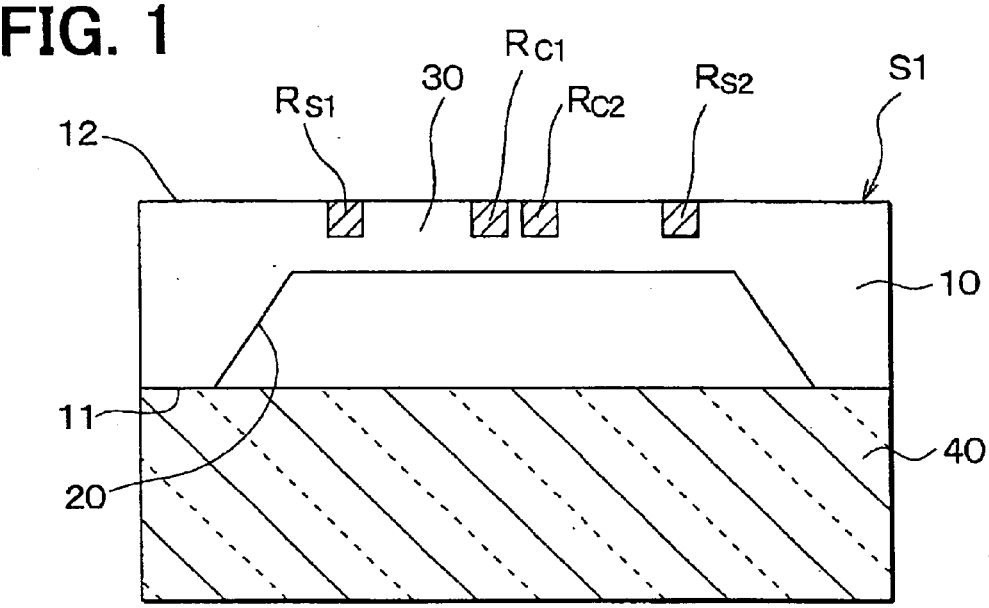
FIG. 1 is a schematic cross-sectional view showing a semiconductor pressure sensor according to a preferred embodiment.
Figure 2:
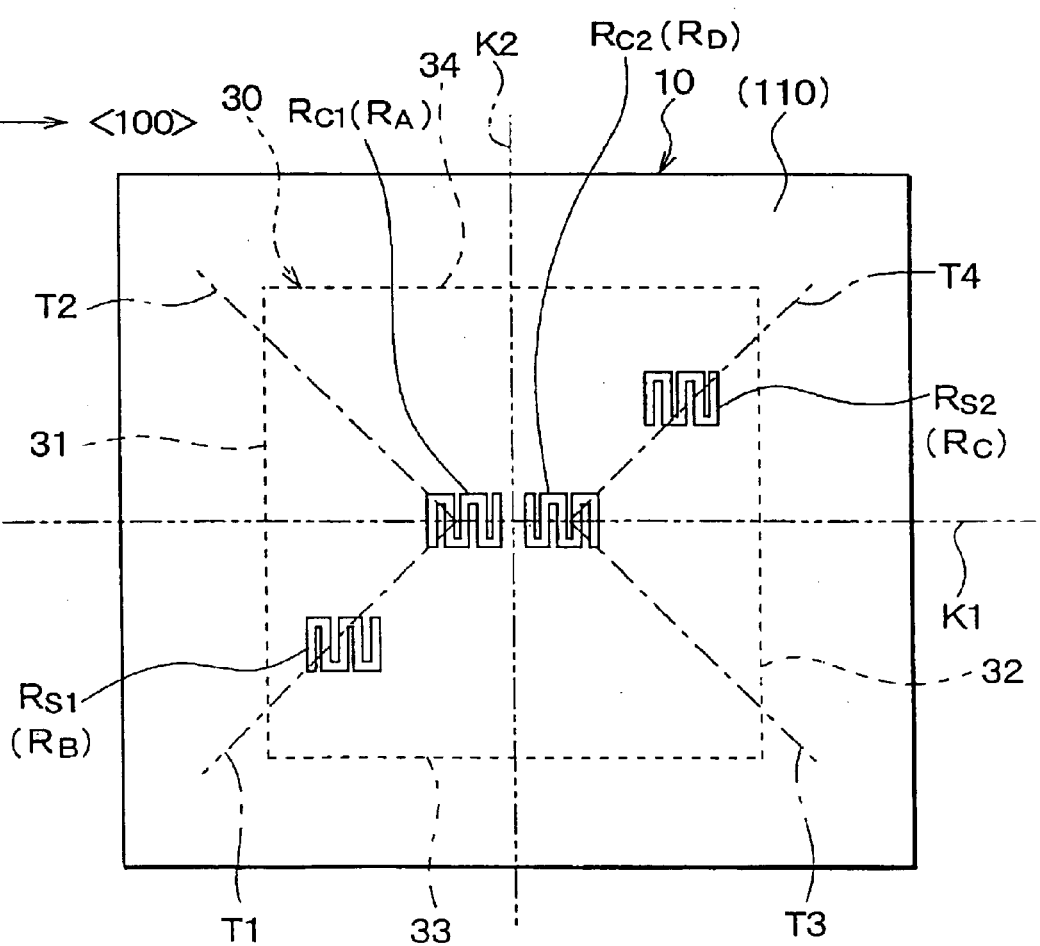
FIG. 2 is a diagram showing the planar shape of a diaphragm formed on a semiconductor substrate of the sensor shown in FIG. 1.

FIG. 1 is a schematic cross-sectional view showing a semiconductor pressure sensor S1 according to an embodiment, and FIG. 2 is a plan view of the semiconductor pressure sensor S1 which is viewed from the upper side and shows the planar shape of a diaphragm 30 formed on a semiconductor substrate 10 of the sensor S1.

The semiconductor substrate 10 is a monocrystal silicon substrate in which the plane direction of the principle surfaces 11, 12 corresponds to (110)-face. That is, In FIG. 1, one surface (lower surface in FIG. 1) 11 of the semiconductor substrate 10 and the other surface (upper surface in FIG. 1) 12 of the semiconductor substrate 10 correspond to the (110)-face.

A recess portion 20 recessed from one surface 11 of the semiconductor substrate 10 is formed in the semiconductor substrate 10. A pressure detecting diaphragm 30 is formed at the bottom surface side of the recess portion 20 which is reduced in thickness in connection with formation of the recess portion 20, that is, at the other surface 12 side of the semiconductor substrate 10.

According to this embodiment, the planar shape of the diaphragm 30 is set to a rectangular shape as shown in FIG. 2. More specifically, the diaphragm 30 is designed to have a square shape comprising four sides, that is, a pair of first sides 31, 32 extending along the <110> crystal axis direction and a pair of second sides 33, 34 extending along the <100>crystal axis direction.

As is shown in FIGS. 1 and 2, strain gage resistors Rc1, Rc2, Rs1, Rs2 constituting a bridge circuit for outputting a detection signal in connection with strain of the diaphragm 30 are formed on the other surface 12 of the semiconductor substrate 10. The strain gage resistors Rc1, Rc2, Rs1, Rs2 are diffusion gage resistors formed by doping, diffusion or the like.

In this case, the strain gage resistors Rc1, Rc2, Rs1, Rs2 are arranged so that the longitudinal direction of the resistors are along the <110> crystal axis direction, and comprise a pair of center gages Rc1, Rc2 disposed at the center portion of the diaphragm 30 and a pair of side gages Rs1, Rs2 disposed to be nearer to the peripheral portion of the diaphragm 30 than the center gages Rc1, Rc2.

In the embodiment shown in FIG. 2, each of the strain gage resistors Rc1, Rc2, Rs1, Rs2 is designed like a wire which is repetitively turned back and forth. The longitudinal direction of each resistance wire turned back and forth corresponds to the longitudinal direction of the resistor.

Here, as indicated by chain double-dashed lines in FIG. 2, a virtual axis which bisects each of the first sides 31, 32 of the diaphragm 30 and passes through the center point of the diaphragm 30 is set as a first axis K1, and a virtual axis which is orthogonal to the first axis K1 and passes through the center point of the diaphragm 30 is set as a second axis K2.

According to this embodiment, when he first axis K1 and the second axis K2 are set in this way, each side gage Rs1, Rs2 is located on a virtual line (T1, T2, T3, T4) which extends from the center point of each of the center gages (Rc1, Rc2) to the peripheral portion of the diaphragm 30 and intersects to the first axis and the second axis at 45°. In FIG. 2, the virtual lines T1, T2, T3, T4 are indicated by chain one-dashed lines.

In the case of FIG. 2, one side gage Rs1 is located on the virtual line T1 of one center gage Rc1, and the other side gage Rs2 is located on the virtual line T4 of the other center gage Rc2.

As shown in FIG. 2, two virtual lines are provided for each of the center gages Rc1, Rc2. That is, each of the side gages Rs1, Rs2 may be disposed on any line of the four virtual lines T1 to T4.

In place of the example of FIG. 2, one center gage Rs1 may be located on the virtual line T2 while the other center gage Rs2 is located on the virtual line T4, one center gage Rs1 may be located on the virtual line T2 while the other center gage Rs2 is located on the virtual line T1, or one center gage RS1 may be located on the virtual line T2 while the other center gage Rs2 is located on the virtual line T3.

However, in any case, the strain gage resistors Rc1, Rc2 Rs1, Rs2 must be arranged so that the longitudinal direction of the resistance of each of the strain gage resistors Rc1, Rc2, Rs1, Rs2 is along the <110> crystal axis direction.

Furthermore, when the pair of side gages Rs1, Rs2 are compared to each other it is preferable that the pair of side gages Rs1, Rs2 are arranged in symmetrical positional relationship with respect to the first axis K1, and also it is preferable that both the side gages are arranged in symmetrical positional relationship with respect to the second axis K2.

By adopting the symmetrical arrangement of the side gages as described above, the respective strain gage resistors Rc1, Rc2, Rs1, Rs2 can be arranged to be symmetrical with one another with respect to the center of the diaphragm 30 at maximum, so that the manufacturing process of the strain gage resistors Rc1, Rc2, Rs1, Rs2 can be facilitated.

Figure 5:
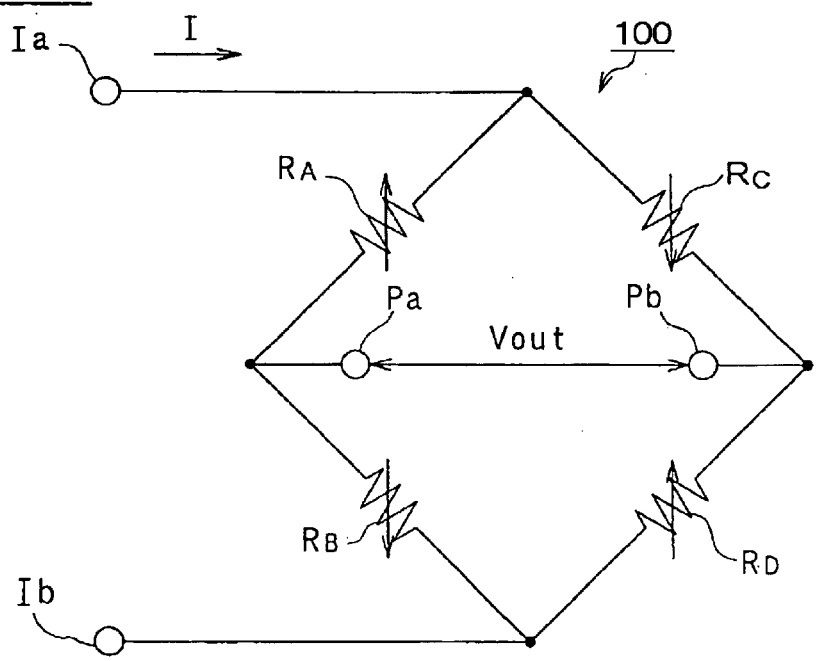
FIG. 5 is a wire connection diagram showing a bridge circuit constructed by the strain gage resistors shown in FIG. 4.

The four strain gage resistors Rc1, Rc2, Rs1, Rs2 constitute the bridge circuit 100 as shown in FIG. 5 to detect the stress occurring in the <110> crystal axis direction when the resistance value of the center gage Rc1 is set to RA, the resistance value of the center gage Rc2 is set to RD, the resistance value of the side gage Rs1 is set to RB and the resistance value of the side gage Rs2 is set to RA.

That is, also in the semiconductor pressure sensor S1 of this embodiment, the strain gage resistors Rc1, Rc2, Rs1, Rs2 are connected to one another in series to form a rectangular closed circuit, thereby constructing a Wheatstone bridge. The connection of the respective strain gate resistors is carried out through wires constructed by diffusion layers or the like (not shown).

In the bridge circuit 100 shown in FIG. 5, the strain of the diaphragm 30 appears as variation of the resistance values RA, RB, RC, RD of the strain gage resistors under the state that DC constant current I is supplied from the input terminal Ia to Ib, and the voltage (detection signal) having the level corresponding to the detected output, that is, the midpoint potential Vout is output from a point between the output terminals Pa and Pb.

As shown in FIG. 1, the semiconductor pressure sensor S1 is bonded to a glass seat by anode bonding or the like on the one surface of the semiconductor substrate 10. In this embodiment, the inside of the recess portion 20 is hermetically sealed by the glass seat 40 and set as a reference pressure chamber to thereby construct an absolute pressure type pressure sensor.

Although not shown, a pressure introducing passage through which the recess portion 20 and the outside intercommunicate with each other may be formed in the glass seat 40. In this type of semiconductor pressure sensor S1, pressure under measurement may be introduced through the pressure introducing passage into the recess portion 20 so that the back surface of the diaphragm 30 receives the pressure thus introduced.

The semiconductor pressure sensor S1 as described above can be formed as follows.

First, the semiconductor substrate 10 in which the plane direction of the principle surface, that is, one surface 11 and the other surface 11 corresponds to the (110)-face is prepared. Then, the strain gage resistors Rc1, Rc2, Rs1, Rs2, various kinds of wires, etc. are formed on the other surface of the semiconductor substrate 10 by using a semiconductor manufacturing technique such as ion doping, diffusion, etc.

Thereafter, an etching mask (not shown) with an opening portion having a predetermined shape is formed in the one surface 11 of the semiconductor substrate 10. The etching mask may be formed of silicon nitride film by CVD (Chemical Vapor Deposition) or the like.

After the etching mask is formed on the one surface 11 of the semiconductor substrate 10 as described above, etching is carried out on the semiconductor substrate 10 from the one surface 11 thereof, whereby the recess portion 20 is formed in the semiconductor substrate 10 and the diaphragm 30 is formed at the bottom surface side of the recess portion 20 in the semiconductor substrate 10.

Anisotropic etching using alkali etching liquid such as KOH (potassium hydroxide), TMAH (Tetra-Methyl Ammonium Halide) or the like may be used as etching for formation of the diaphragm.

The semiconductor pressure sensor S1 having the strain gage resistors Rc1, Rc2, Rs1, Rs2 and the diaphragm 30 is completed as described above. Thereafter, the semiconductor pressure sensor S1 is subjected to etching or the like to remove the etching mask, and then joined to the glass seat 40 by the anode bonding or the like.

As described above, when the first axis K1 and the second axis K2 are set in the diaphragm having a square shape in plan view are set as described above, the present invention is characterized in that each side gage Rs1, Rs2 is located on the virtual lines T1 to T4 which extend from the center point of each center gage Rc1, Rc2 to the peripheral portion of the diaphragm and intersect to the first axis K1 and the second axis K2 at 45°.

This feature of the present invention is based on the analysis based on the finite element method (FEM) which has been made on the semiconductor pressure sensor S1 by the inventors. The inventors have analyzed the difference in thermal stress at various positions on the diaphragm 30 with respect to the thermal stress applied to the center gages Rc1, Rc2.

Figure 3:
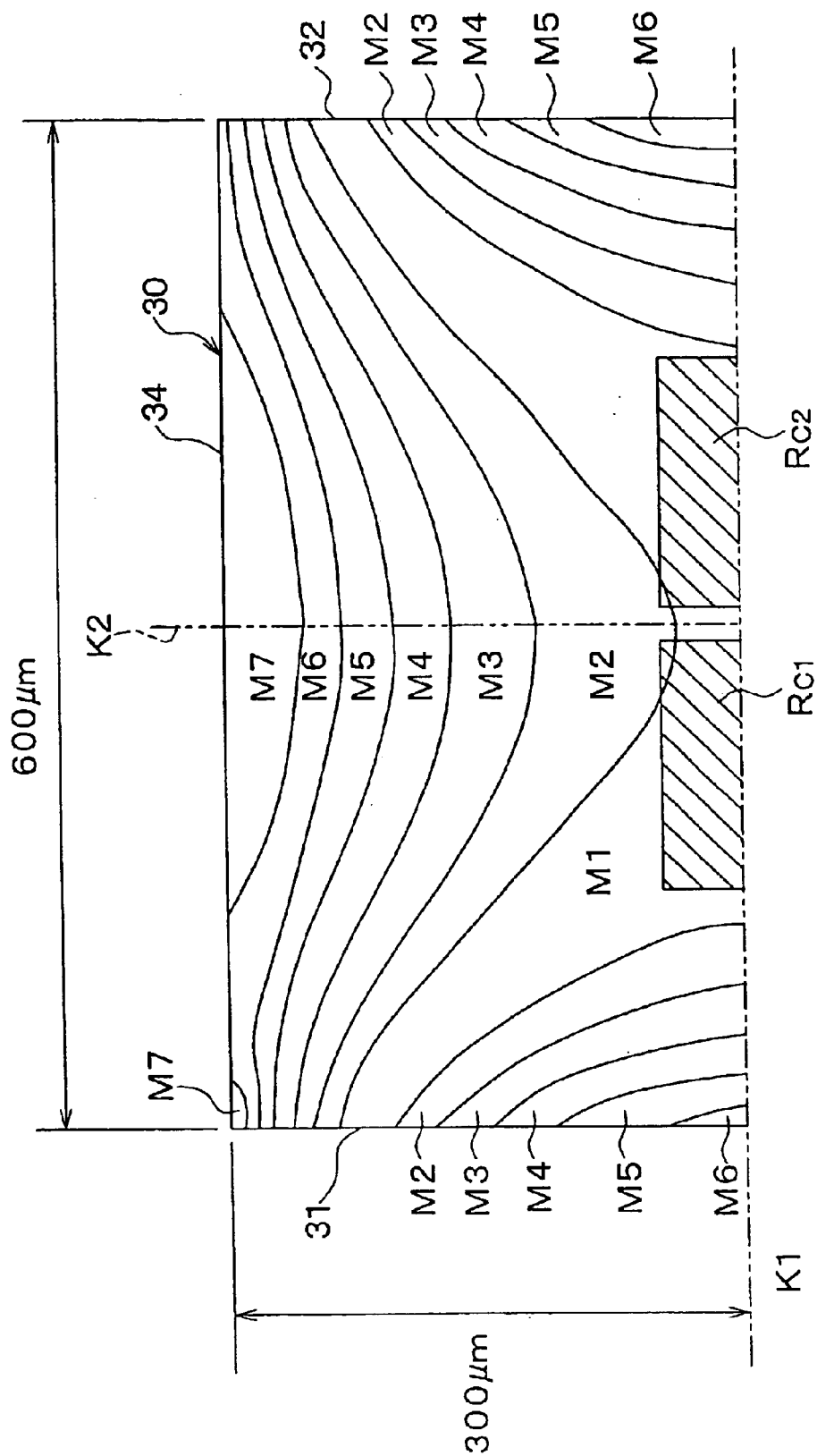
FIG. 3 is a diagram showing a thermal stress distribution in the diaphragm on the basis of a finite element method analysis made by the inventors.
Figure 4:
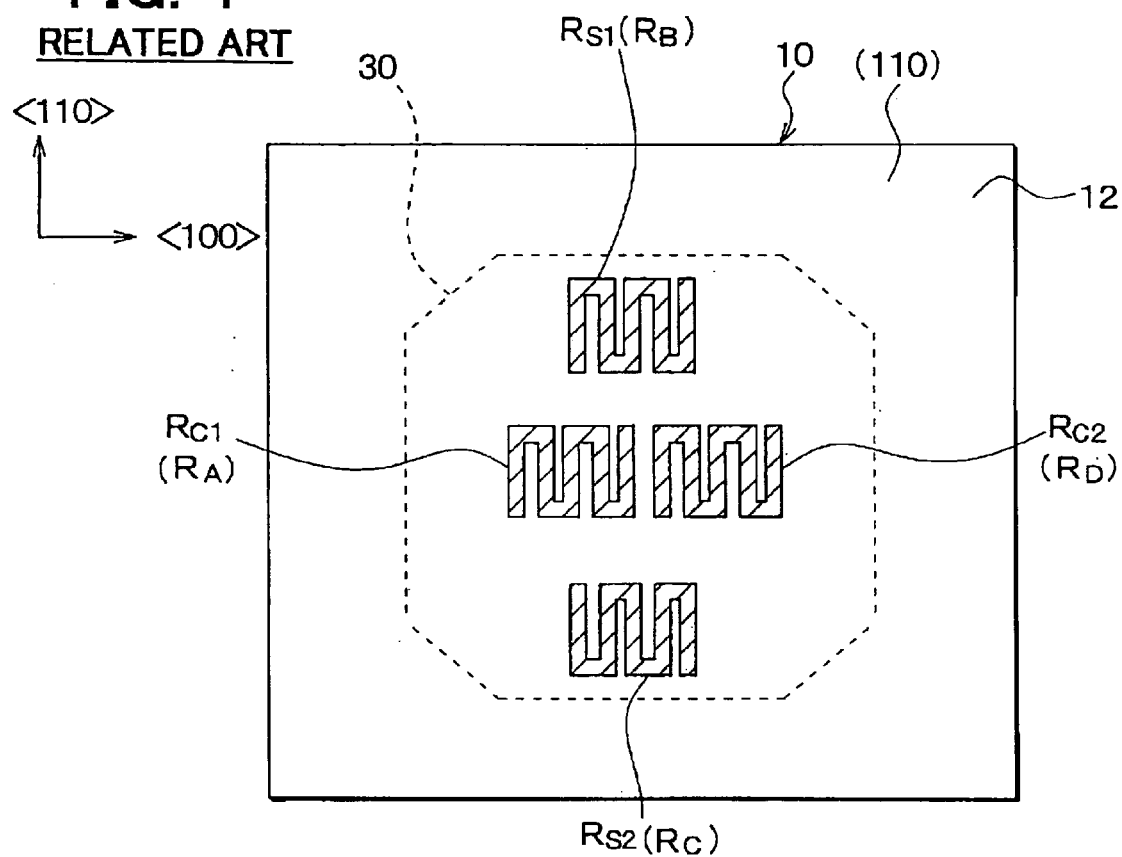
FIG. 4 is a diagram showing an arrangement state of strain gage resistors on a principle surface of a semiconductor substrate in a related art semiconductor pressure sensor using the semiconductor substrate whose principle surface corresponds to (110)-face.

FIG. 3 is a diagram showing a distribution state of the thermal stress difference determined by this analysis. In this case, an upper half area located at the upper side from the first axis K1 in the diaphragm 30 having the square of 600 μm×600 μm is illustrated in FIG. 3. The distribution of the lower half area of the diaphragm 30 is symmetrical with that of the upper half area with respect to the first axis K1, and thus it is omitted from the illustration.

In FIG. 3, the magnitude in the thermal-stress difference at the respective positions with respect to the thermal stress occurring at the center of the center gage Rc1, Rc2 is represented by distribution lines like contour lines in a map. In this case, the areas M1 to M7 are sectioned by the distribution lines, and the thermal-stress difference is stepwise intensified from the area M1 to the area M7 in this order by every 0.01 Mpa.

Specifically, the thermal-stress difference ranges from 0 to 0.01 MPa in the area M1, from 0.01 to 0.02 MPa in the area M2, from 0,02 to 0.03 MPa in the area M3, from 0.03 to 0.04 MPa in the area M4, from 0.04 to 0.05 MPa in the area M5, from 0.05 to 0.06 MPa in the area M6, and from 0.06 to 0.07 MPa in the area M7.

As is apparent from FIG. 3, when the side gates Rs1, Rs2 are disposed in the area M1, the difference between the thermal stress applied to the center gages Rc1, Rc2 and the thermal stress applied to the side gages Rs1, Rs2 can be approached to zero at the maximum. The area M1 is substantially coincident with the virtual lines T1 to T4.

Accordingly, by locating each of the side gages Rs1, Rs2 on the virtual lines T1 to T4, the difference between the thermal stresses applied to the center gages Rc1, Rc2 and the side gages Rs1, Rs2 can be reduced at maximum. Furthermore, by adopting the gage arrangement as described above, there can be provided the semiconductor pressure sensor S1 having an excellent TNO characteristic even when the diaphragm 30 is miniaturized.

It should be noted that the side gages are not required to be located on the virtual lines T1 to T4 at 45° if both the side gages are located at portions having the same stress distribution in the substrate.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A semiconductor pressure sensor comprising:
   a semiconductor substrate having a principle surface corresponding to (110)-face;
   a pressure detecting diaphragm formed on the principle surface of the semiconductor substrate; and
   strain gage resistors formed on the diaphragm for constituting a bridge circuit and outputting a detection signal in connection with strain of the diaphragm,
   wherein the pressure detecting diaphragm has a planar shape comprised of four sides, the fours sides including a pair of first sides extending along <110> crystal axis direction and a pair of second sides extending along <100> crystal axis direction,
   wherein the strain gage resistors comprise a pair of center gages disposed at a center portion of the pressure detecting diaphragm along the <110> crystal axis direction and a pair of side gages disposed be nearer to a peripheral portion of the pressure detecting diaphragm than the center gages so both of the pair of side gages are disposed at a portion of the semiconductor substrate having approximately a same stress distribution.

2. The semiconductor pressure sensor according to claim 1, wherein when an axis bisecting each of the first sides of the diaphragm and passing through the center point of the diaphragm is set as a first axis and an axis vertically-intersecting to the first axis and passing through the center point of the diaphragm is set as a second axis, wherein each of the side gages is located on a virtual line which extends from the center point of each of the center gages to the peripheral portion of the diaphragm and intersects to the first axis and the second axis at 45°.

3. The semiconductor pressure sensor according to claim 2, wherein the pair of side gages are arranged to be positionally symmetrical with each other with respect to the first axis.

4. The semiconductor pressure sensor according to claim 3, wherein the pair of side gages are arranged to be positionally symmetrical with each other with respect to the second axis.

* * * * *